Oct. 8, 1957 W. L. GRUND 2,808,619
TIRE VULCANIZER
Filed Dec. 16, 1954
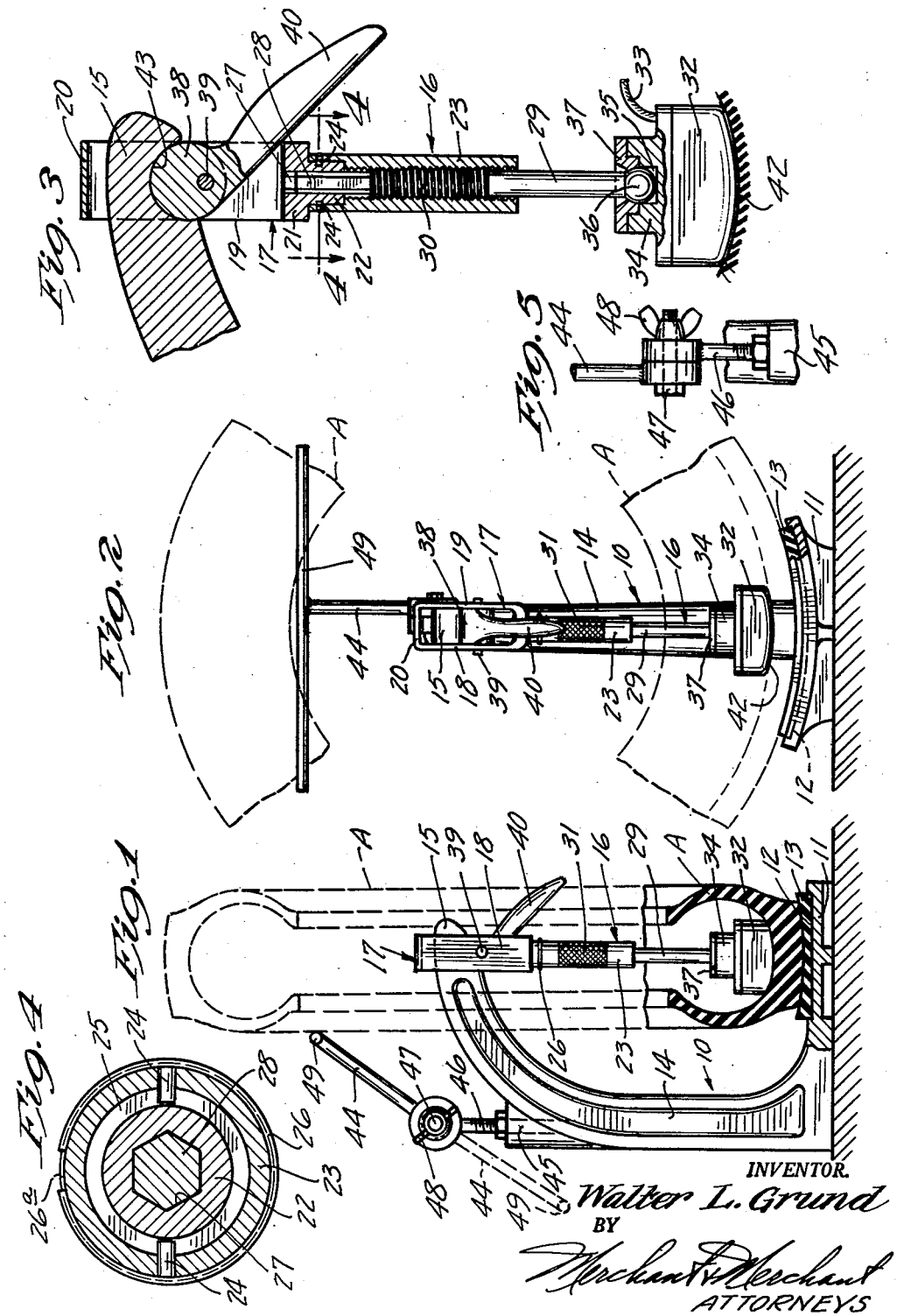
INVENTOR.
Walter L. Grund
BY
Merchant & Merchant
ATTORNEYS

United States Patent Office 2,808,619
Patented Oct. 8, 1957

2,808,619
TIRE VULCANIZER

Walter L. Grund, Minneapolis, Minn.

Application December 16, 1954, Serial No. 475,671

2 Claims. (Cl. 18—18)

My invention relates to a novel and improved tire vulcanizer, and particularly it relates to a tire vulcanizer for permanently repairing holes, cuts, breaks and the like in a casing of a tubeless or conventional tire.

An object of my invention is to provide a novel and improved tire vulcanizer which is of rugged and durable construction and is simply and easily operated.

Another object of my invention is to provide a tire vulcanizer which is easily and simply adjusted to various sizes and thickness of tires and is controllably operated to provide proper vulcanizing heat and pressure.

Another object of my invention is to provide a tire vulcanizer comprising a tire-supporting frame which can be adjusted to support the tire in an upright position suitable for tread repair or in various tilted positions suitable for shoulder or side wall repairs.

Another object of my invention is to provide a tire vulcanizer which can be removed and installed in and out of a tire while still hot.

A further object of my invention is to provide a tire vulcanizer comprising an extensible leg unit having at one end a controllably heated pressure shoe adapted to engage the inside of the tire casing, which is cam-actuated to provide the desired pressure and which is detachably supported on a standard so that the unit may be easily and quickly removed from the supporting standard or tire.

These and other objects and advantages will be disclosed in the course of the following specification and claims, reference being had to the accompanying drawings wherein:

Fig. 1 is a view in side elevation with some parts broken away, showing a tire casing mounted thereon partly in dotted line and partly in section, of my invention;

Fig. 2 is a view in front elevation of the structure shown in Fig. 1 with some parts broken away;

Fig. 3 is an enlarged fragmentary detailed view of a portion of Fig. 1, partly in side elevation and partly in section;

Fig. 4 is an enlarged view in horizontal section taken on the line 4—4 of Fig. 3; and Fig. 5 is a fragmentary detailed view in rear elevation of a portion of Fig. 1.

Referring more particularly to the drawings, wherein like parts will be indicated by the same numeral, my novel and improved tire vulcanizer, indicated by the general reference numeral 10, comprises a base 11 forming an arcuate-shaped bed 12 adapted to fit the tread of a tire casing, indicated by the letter A and positioned on the base 11. Bed 12 is slightly recessed to receive a pad 13 which engages the tread of the tire casing A. A goose-necked or C-shaped standard 14 is anchored to the base 11, preferably being integrally formed therewith; and its free upper end 15 defines a resistance head upwardly spaced from and overlying the base 11.

A longitudinally extending extensible leg, indicated in its entirety by the general reference numeral 16, comprises a yoke 17 disposed at its upper end. Yoke 17 comprises a pair of spaced parallel bifurcations 18 and 19, a crossbar 20 interconnecting the upper ends of bifurcations 18 and 19, and a lower crossbar 21 having a depending cylindrical boss 22 formed therewith. An internally threaded sleeve 23 is connected to boss 22 for rotation about a generally vertical axis by a pair of oppositely disposed pins 24 extending through the upper end of sleeve 23 into a laterally outwardly opening annular channel 25 formed in boss 22. The pins 24 are maintained in position by snap ring 26 which abuts a shoulder 26a. Lower crossbar 21 and boss 22 have a central hexagonal bore 27 extending therethrough which is adapted to receive the hexagonal upper end 28 of a longitudinally extending shaft 29 coaxially disposed with sleeve 23. Shaft 29 has an externally threaded intermediate portion 30 engaging the internal threads of sleeve 23 so that the rotation of sleeve 23 effects a longitudinally downward or upward movement of shaft 29 and an extension or constriction, respectively, of the effective length of leg 16. The hexagonal shape of bore 27 and end 28 keeps shaft 29 from turning during rotation of sleeve 23. Sleeve 23 is knurled as indicated by the numeral 31 to provide a hand grip which facilitates rotation of sleeve 23 and the adjustment of leg 16.

A pressure shoe 32 contains a heating element, not shown in the drawings but connected to wire 33, that is adapted to controllably heat shoe 32 to a temperature suitable for vulcanization. A cover 34 of shoe 32 is bored to define a socket 35 which is adapted to receive the ball 36 formed at the lower extremity of shaft 29. A socket plate 37 anchors the ball 36 in position to pivotally connect shoe 32 to the lower end of shaft 29.

A generally cylindrical cam element 38 is disposed between bifurcations 18 and 19 and is connected thereto by pin 39 for pivotal movement on a generally horizontal eccentric axis. A cam lever 40 is anchored to cam element 38 to actuate the pivotal movement thereof, and preferably, as shown, is formed integrally therewith. The free end 15 of standard 14 is received by yoke 17 between crossbar 20 and cam element 38; and as particularly shown in Fig. 2, the free end 15 engages bifurcations 18 and 19 to limit any lateral movement of the leg 16.

Leg 16, when it is in an inoperative position, is supported by standard 14 in generally vertically disposed depending relationship, wherein crossbar 20 engages free end 15 thereof. Leg 16 and pressure shoe 32 anchored thereto may be easily detached from standard 14 by slipping the yoke 17 off of the free end 15. When a tire casing, either tubeless or conventional, is ready to be repaired, leg 16 and shoe 32 are removed from the standard 14 and the tire casing A is positioned on the base 11, as shown in Figs. 1 and 2. Detachable leg 16 is then again positioned on the standard 14 with the pressure shoe 32 disposed on the inside of the casing A. To place my tire vulcanizer in operating position, it may be necessary to adjust the length of leg 16 so that arcuate face 42 of pressure shoe 32 engages that portion of the casing to be repaired and cam element 38 engages a downwardly opening arcuate seat 43 formed in free end 15 of standard 14. The adjustment of the effective length of extensible leg 16 adapts my vulcanizer 10 for tires of various tread thickness. At the operative position of vulcanizer 10, leg 16 is generally vertically disposed and the pivotal movement of cam element 38 is adapted to move the leg generally toward and away from the base 11 which results, respectively, in an increase or decrease in the pressure applied by shoe 32 against the tire casing A. A generally vertically upward movement of the leg 16 resulting in a decrease in the pressure applied by shoe 32 is effected by a generally upward movement of the cam lever 40; and conversely, a generally downward movement of the cam lever 40 effects a generally downward movement of leg 16 and an increase in the pressure applied by shoe 32. The proper adjustment of cam element 38 by lever 40 effects the desired pressure for proper vulcanization. After a repair to the tire casing has been made, leg 16 and pressure shoe 32 may be removed from the casing and easily detached from standard 14 even while shoe 32 is still hot. The ease with which the leg 16 and shoe 32, as an integrated assembly, can be removed and installed in and out of a tire casing while still hot, is a very important feature of my invention.

I also provide a tire supporting frame, indicated in its entirety by the numeral 44, which is connected to and supported by standard 14 and is pivotally adjustable to support the tire casing A in an upright position suitable for tread repair, as shown in Fig. 1, or to support the tire in various tilted positions suitable for side wall or shoulder repairs. Specifically, standard 14 has a generally upwardly projecting boss 45 to which is anchored a connecting shaft 46. Frame 44 is connected by pivot pin 47 to shaft 46, see Fig. 5, for pivotal movement on a generally horizontal axis at right angles to the axis of the tire casing A when the latter is in position on base 11. Pivot pin 47 is provided with a wing nut 48 to lock the frame 44 in any angular position about its pivotal axis defined by pin 47. Frame 44 is generally T-shaped with the horizontal crossbar 49 thereof spaced from and parallel to the pivotal axis defined by pivot pin 47. The supporting frame 44, as shown in full lines in Fig. 1, is properly positioned to support the tire casing A in an upright position on base 11; and it is clear, that by loosening nut 48, the frame 44 may be pivoted about pin 47 to give the desired angle of tilt to tire casing A for repairing other portions thereof. A second position of frame 44 is shown in dotted lines in Fig. 1. The swivel connection of pressure shoe 32 to leg 16, together with the arcuate shape of shoe 32 particularly adapts my vulcanizer 10 for shoulder and side wall repairs.

My invention has been built and tested and found to accomplish all of the afore-mentioned objectives and advantages. It will be obvious to those skilled in the art that my invention may be modified by many substitutions and equivalents and that this disclosure is intended to be illustrative only; therefore, I intend to be limited solely by the scope of the appended claims.

What I claim is:

1. A tire vulcanizer comprising a base adapted to receive a tire casing, a bent standard anchored to said base and having its free upper end upwardly spaced from and overlying said base, said free end forming an arcuate downwardly opening seat, a longitudinally extensible leg having a yolk formed at its upper end adapted to detachably receive the free end of said standard, said yolk comprising a pair of spaced parallel vertically disposed bifurcations, a cam element disposed between said bifurcations and connected thereto for pivotal movements on a generally horizontally disposed eccentric axis, the free end of said standard being snugly detachably receivable between said bifurcations above the plane of the cam element whereby to limit lateral movements of said leg when the cam element is received in said seat, and a controllably heated pressure shoe anchored to the lower end of said leg and adapted to engage the inside of a tire when the latter is in position on said base.

2. The structure defined in claim 1 in further combination with a tire supporting frame connected to and supported by said standard, said frame being pivotally swingable about a horizontal axis transversely disposed with respect to the axis of a tire casing mounted in position on said base, and means for locking said frame in any angular position about its pivotal axis, said frame engaging the tire casing to support it in an upright position suitable for tread repair and in various tilted positions suitable for shoulder or sidewall repairs.

References Cited in the file of this patent

UNITED STATES PATENTS

| 1,718,485 | O'Sullivan | June 25, 1929 |
| 2,506,375 | Meath | May 2, 1950 |

FOREIGN PATENTS

| 29,713 | Great Britain | Dec. 15, 1897 |